(No Model.)
W. B. ROSS.
GUIDE AND TENSION DEVICE FOR TRACTION CABLES.
No. 304,755. Patented Sept. 9, 1884.
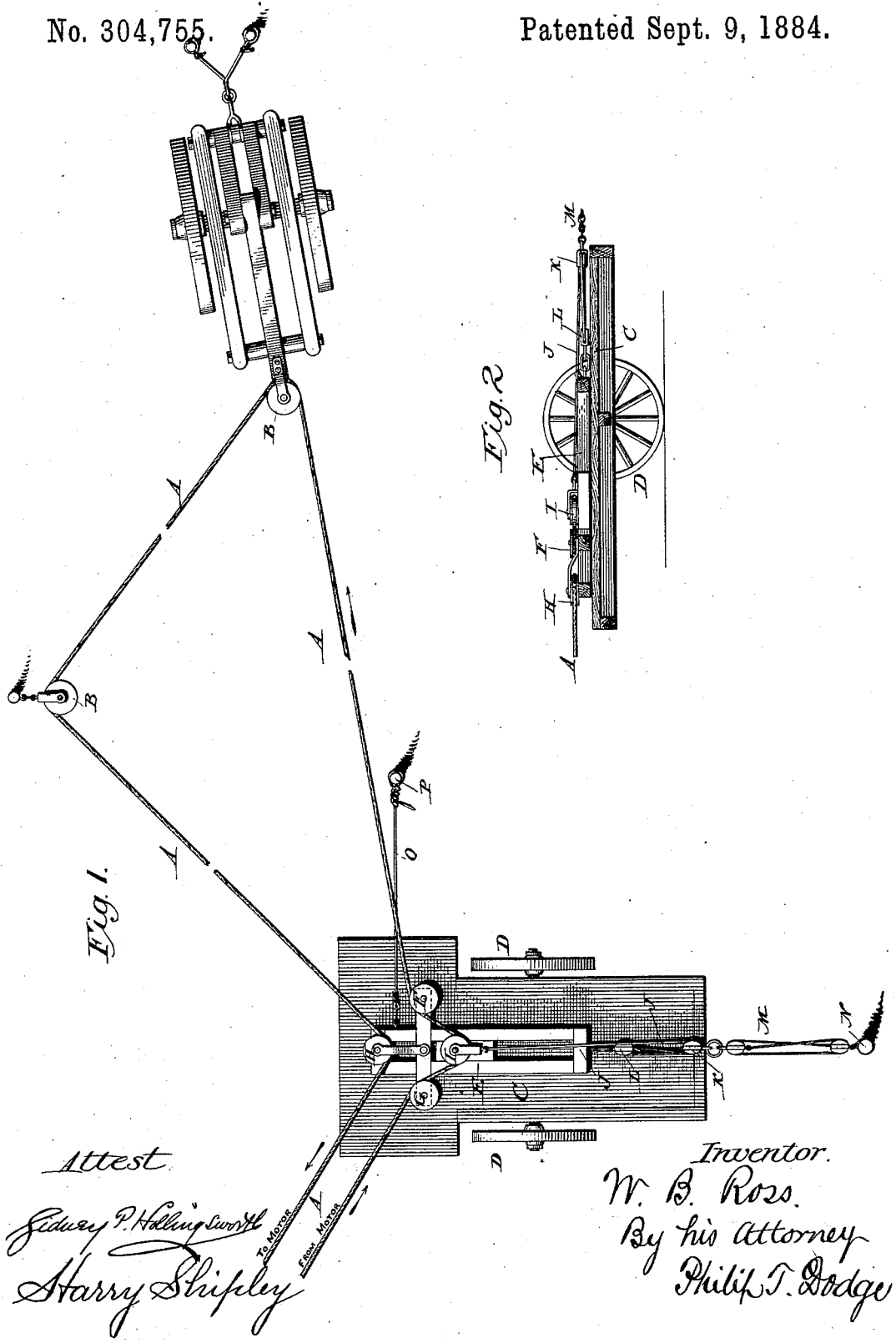
Attest
Sidney P. Hollingsworth
Harry Shipley
Inventor.
W. B. Ross.
By his Attorney
Philip T. Dodge

UNITED STATES PATENT OFFICE.

WILLIAM B. ROSS, OF NASHVILLE, TENNESSEE.

GUIDE AND TENSION DEVICE FOR TRACTION-CABLES.

SPECIFICATION forming part of Letters Patent No. 304,755, dated September 9, 1884.

Application filed February 16, 1884. (No model.)

*To all whom it may concern:*

Be it known that I, WILLIAM B. ROSS, of Nashville, in the State of Tennessee, have invented certain Improvements in Guide and Tension Devices for Traction-Cables, of which the following is a specification.

This invention has reference to endless traction-cables for operating plows, dredges, scrapers, cars, and other objects which require to be propelled, as well as to cables employed for the purpose of transmitting motion to machinery fixed in position.

The invention relates more particularly to a system in which the cable and co-operating parts are adapted to be moved or transported from place to place as occasion may require.

It consists in an improved means for automatically maintaining a given tension, mainly in such portions of the cable as have slackened through the stretching of the cable or attachments by the local application of loads, and also for permitting the tension to be increased or diminished at will.

Referring to the accompanying drawings, Figure 1 represents a top plan view of my improved apparatus in connection with a cable. Fig. 2 is a sectional view of the movable carriage on which the take-up devices are mounted.

Referring to the drawings, A represents the endless cable, which will be extended horizontally around sustaining sheaves or pulleys B, which may be sustained in any suitable manner, and arranged in any position required to carry the cable in the desired direction.

The foregoing parts and the mechanism for transmitting motion to the cable may be constructed in any suitable manner, my present invention having no special bearing thereon.
In practice it is found in operating cables of great length, particularly when moved by friction against driving-wheels, and when subjected to severe labor through locally applied loads, that they change in position and relative length to an extent which is frequently the cause of slipping, which gives much trouble. It is to avoid this difficulty and to secure the automatic compensation for variations in length that the present invention is designed. To this end I make use of a flat frame, C, mounted on two supporting-wheels, D, which admit of its being readily moved about from place to place and fixed in position when required. On this platform of the carriage I mount loosely, and so that it may play horizontally thereon, a frame, E, giving support to four sheaves, F, G, H, and I. The movable frame E is preferably cruciform, as shown in the drawings, with the sheaves arranged on the four limbs of the frame, or, in other words, at the corners of an imaginary square. The three sheaves F, G, and H are fixed in position on the movable frame E, but the fourth sheave, I, is mounted on a sliding block or other suitable guide, arranged to slide lengthwise of the frame in order to admit of the sheave being carried backward away from its companions. One side of the cable—that is to say, the part of the cable moving in one direction, and which is severely strained by the application of loads to it at one or more points—is passed around or behind the fixed sheave H, while the opposite side of the cable, or the portion running in the opposite direction, is passed across the front of the two sheaves F and G, and thence backward between them and around the rear side of the movable sheave I.

It will be seen that under the foregoing arrangement of parts an increased tension on the portion of the cable at H will produce a movement of the frame E bodily forward on the carriage and will have the effect of moving all the sheaves except I, thus deflecting the cable around the sheave I, so as to apply increased tension thereto when the sheave I is fixed or drawn back relatively to the other sheaves.

In order to secure the proper adjustment of the frame E and pulley I with respect to each other and to the cable, a chain or rope, J, is attached by a shackle of any suitable character to the sheave I and extended thence backward through a pulley-block, K, thence forward through a pulley-block, L, attached to the rear end of the frame, its end being connected with either of the blocks or to the frame, as preferred. The rear block, K, is connected by a chain, M, or equivalent connection, to stationary stakes or an anchor, N, usually fixed in the ground.

It will be observed that under the above construction the pulley-block K is held in a stationary position, and that owing to the arrangement of the connecting-tackle a movement of the frame E bodily forward by means of increased tension at H will have the effect of causing the tackle to move the sheave I backward and so take up the slack in the cable and produce a less tension in it at I than at H.

It will also be observed that the tackle is so arranged that to give a forward strain on the frame E by means of the tension on the cable at H will cause a less strain to be applied to draw the sheave I and doubled cable backward, which is approximately a fixed proportion for the strain at H.

In practice it is found that the apparatus operates as follows: Whenever the strain or resistance of the cable increases so that its front side tends to draw the sheave H forward, the latter, acting through the intermediate parts, causes the frame E and the other sheaves to be moved forward, the effect of which is, when the parts are properly proportioned, to practically maintain a sufficient tension of the cable at I, and from it to the friction-motor, to prevent slipping thereon.

It is manifest that the tackle-blocks K L may contain a greater or less number of pulleys, according to the advantage which it is required to give the sheave I over the moving frame E. When it is required to change the tension of the cable positively, the chain or rope M by which the tackle-block K is connected to the stationary stakes or anchor will be passed through intermediate blocks, by means of which the block L may be moved backward toward the anchor at will. This will have the effect of applying additional strain throughout the entire system.

In order to secure a satisfactory action of the parts, it is advisable to lock the carriage in such position with reference to the bend of angle in the cable that the resulting strain at H will tend to slightly move the frame E to one side of the center line of the carriage, and to resist this movement by connecting with the frame a long rope or chain, O, extended from its other side to a distant stake or anchor, P. This arrangement causes the frame E to be retained in place on the carriage, but admits of its moving longitudinally with great freedom. It avoids the danger which would otherwise be encountered of a side strain tending to overturn the frame and carriage.

It is to be understood that the carriage may be modified in form and arrangement as desired, and that like changes may be made in the sliding frame E, provided that they are adapted to operate in the manner set forth.

While it is preferred to make use of the wheeled platform to support the adjustable frame and sheaves for the reason that it constitutes the most convenient means of transporting said parts, it will of course be understood that a stationary platform or a platform supported upon runners or otherwise may be employed.

Having thus described my invention, what I claim is—

1. In combination with a traction-cable, the movable frame having the three sheaves fixed thereon, the independently-movable sheave and connecting devices, substantially as described, whereby the advance of the movable frame is caused to effect a backward movement of the sliding sheave.

2. In combination with the endless cable, the platform or support, the movable frame E, having the three sheaves F, G, and H fixed thereon, the movable sheave I, a stationary anchor, and tackle, substantially as described, extending from the movable sheave to said anchor and thence to the frame E, substantially as described.

3. In combination with an endless cable, a tension-sheave acting against a portion of the cable which moves in one direction, a second tension-sheave acting on a portion of the cable which moves in the opposite direction, a stationary guide or anchor, and connecting-tackle extending from one of said sheaves around the stationary guide to the opposite sheave, whereby a forward movement of one sheave is caused to effect a backward movement of the other, thus maintaining the tension of the cable.

4. In a portable tension apparatus for an endless cable, the combination of the wheeled carriage, the movable frame E thereon, the three sheaves fixed in said frame, the movable sheave thereon, and the tackle, substantially as described, connecting the movable sheave and the movable frame.

5. In combination with the endless cable, the sheave-supporting frame arranged with respect to the angle of the cable as to be urged laterally thereby, as described and shown, and the connection O, extending from the frame to a stationary anchor, substantially as described, whereby the frame is prevented from moving laterally, but permitted to move forward and backward with freedom.

WILLIAM B. ROSS.

Witnesses:
J. S. ROSS,
GEO. C. DURY.